United States Patent Office 2,799,097
Patented July 16, 1957

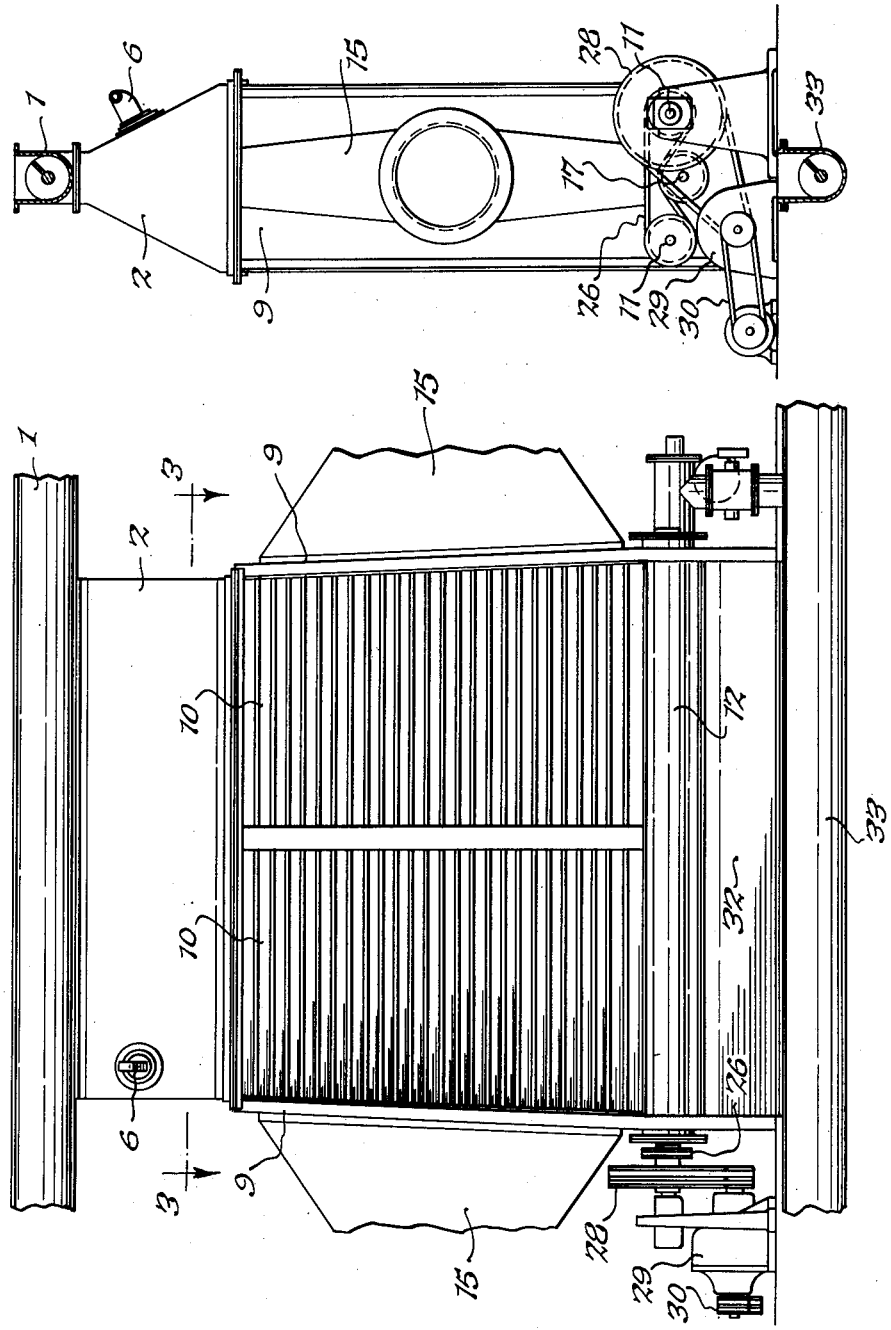

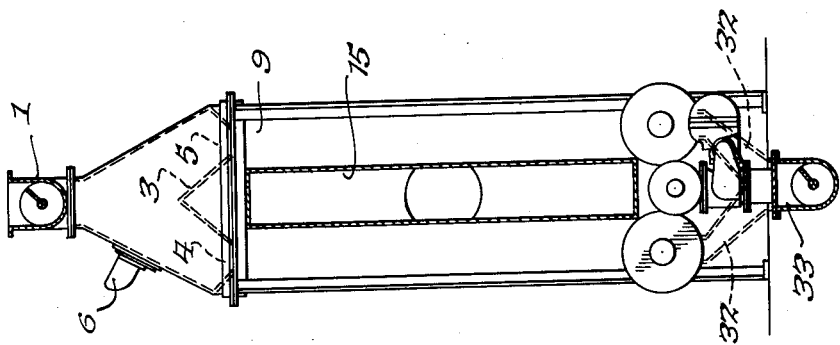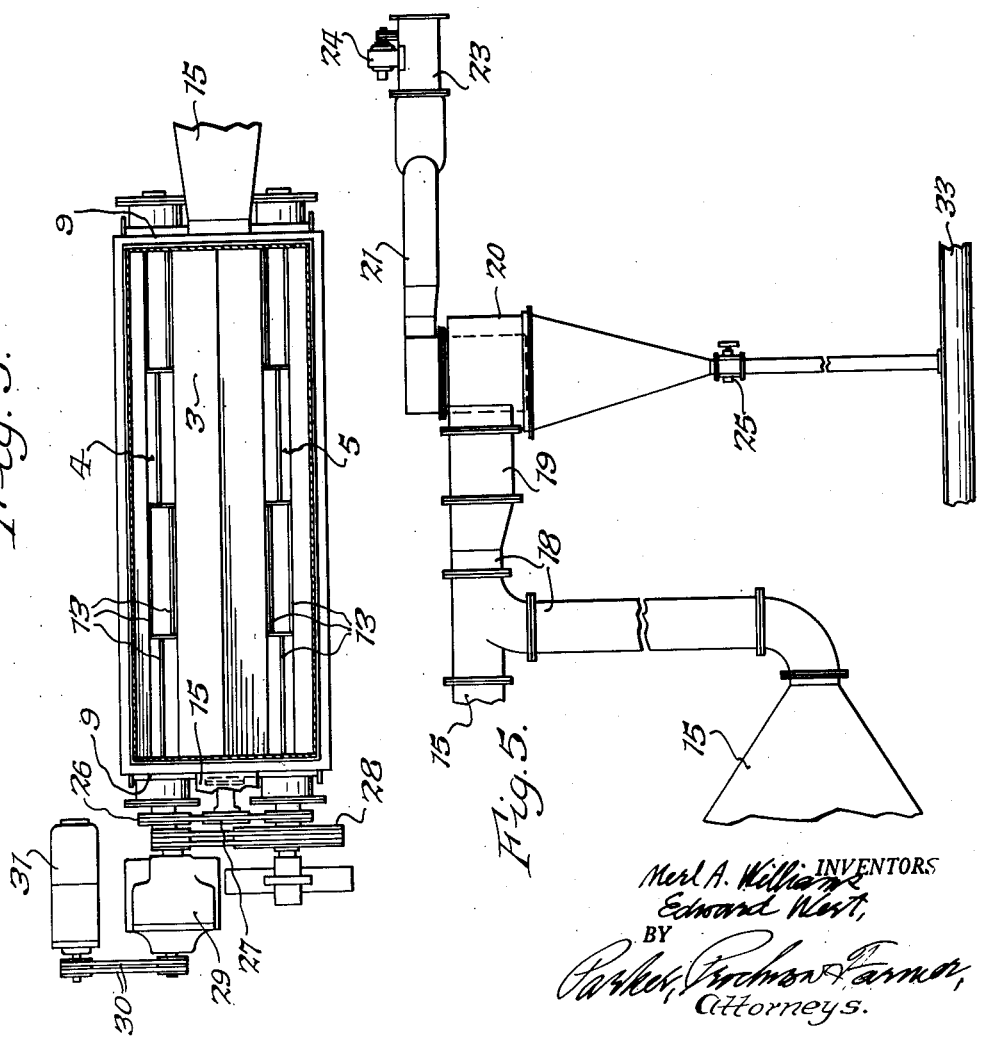

2,799,097

COOLING OF HOT PARTICLES SUCH AS HOT MEAL

Merl A. Williams, Craigville, Ind., and Edward Wert, Colorado Springs, Colo., assignors to The French Oil Mill Machinery Company, Piqua, Ohio Application December 3, 1953, Serial No. 396,004

9 Claims. (Cl. 34—56)

This invention relates to the cooling of masses of hot, loose particles of solids, such as hot meal. Meal such as soybean meal, cotton seed meal, and the like, when discharged from a processing treatment is often hot and sticky and needs cooling, and this invention is directed to an improved method and apparatus for cooling and drying such meal and other hot, loose particles where a similar problem is encountered.

An object of this invention is to provide an improved method and apparatus for cooling and drying a mass of loose, hot, small particles of solid materials, by which the mass may be rapidly, inexpensively and effectively cooled and, if wet, dried somewhat in a simple manner without withdrawing appreciable quantities of the very fine particles from the mass, and with which sticky, wet, hot particles, such as of soybean meal and cotton seed meal, may be successfully cooled and dried somewhat, in a continuous operation.

Another object is to provide a simple, compact and inexpensive apparatus for cooling a mass of loose, hot, small particles of solids, even when wet and sticky, rapidly and effectively, and at a relatively low cost of operation, which can operate continuously for relatively long periods without stopping or choking, with which most of the finest particles will remain in the cooled mass in approximately the same percentage as received in the hot mass, so as to deliver a uniform product, which will have a minimum of moving parts and a minimum of wear on the operating parts, which will operate with a minimum of power per unit mass cooled, which will dry the particles of the mass being treated, which will operate for relatively long periods with minimum repair and maintenance costs, and which requires a minimum of operating power per unit of mass cooled.

Other objects and advantages will be apparent from the following description of embodiments of the invention, and the novel features will be particularly pointed out hereinafter in connection with the appended claims.

In the accompanying drawings:

Fig. 1 is a front elevation of a cooler constructed in accordance with this invention;

Fig. 2 is one end elevation of the same;

Fig. 3 is a sectional plan of the same along line 3—3, Fig. 1;

Fig. 4 is the other end elevation of the same;

Fig. 5 is a front elevation of the suction-creating means which is employed with the mechanism shown in Figs. 1-4;

Figure 7:
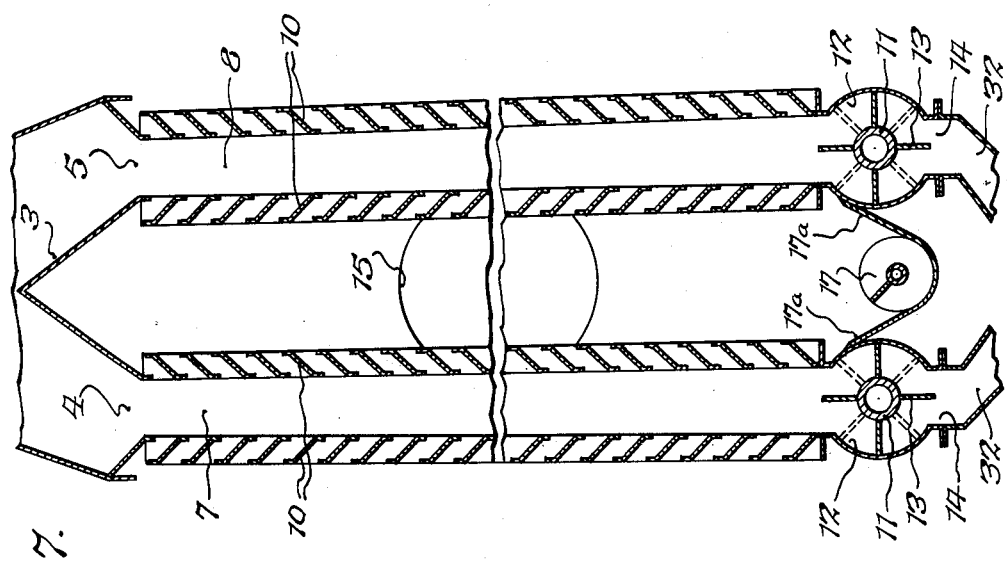
Fig. 7 is a diagram illustrating the manner in which the meal is formed into columns in the cooler and released from the bottom.

In the embodiment of the invention illustrated in Figs. 1-7, and referring first to Figs. 1-4 and 7, the meal or other loose, solid particles to be cooled are brought to the cooler through a suitable conveyor 1, Fig. 1, and deposited into the upper end of the hopper 2, and this hopper increases in horizontal dimensions from front to rear as it progresses downwardly. On the bottom of the hopper is a V-shaped wall 3, see Fig. 7, which divides the lower end of the hopper 2 into two separate passages 4 and 5. A pressure operated electric device 6, such as one having a diaphragm operated switch, is provided on a wall of the hopper near its upper part with its diaphragm exposed to pressure of solids in said hopper, so that as the level of loose particles or solids, such as meal, falls below a safe level in the hopper 2, an electric circuit may be made effective to warn the operator that conditions for satisfactory operation are lacking. There must be a substantial quantity of solids or meal in this hopper at all times during the operation.

The passages 4 and 5 at the bottom of the hopper discharge into the upper ends of passages 7 and 8, see Fig. 7. These passages extend between the end walls of housing 9 on which the hopper 2 is placed, and the front and rear walls of each of these passages have many small openings or apertures and are, in effect, reticulated walls, such as either screens or louvers for example. In the embodiment shown in Figs. 1 to 7, the reticulated walls are both formed by louvers 10, see Fig. 7, which louvers converge inwardly and downwardly of the passage so that the loose meal or particles in passing down either passage will be confined therein as a moving wall of loose material. The distance horizontally between these reticulated or louvered walls in each passage 7 and 8 increases progressively downwardly, so that the thickness of the wall of meal or particles in the wall of material in each passage will increase progressively downwardly. Thus, there will be no choking of the passage by the meal, due to frictional resistance and pressure of the particles or meal against the walls.

Similarly, the end walls of the housing which define the ends of these passages 7 and 8, diverge downwardly, so that there will be no tendency of the particles to pack against the end walls and choke the passage. At the bottom of each passage is a shaft 11 which is disposed axially in a conduit 12 that extends horizontally at the bottom of the passage but opens upwardly at its side into the bottom of the passage. This shaft carries a plurality of vanes 13 that extend radially therefrom, with the outer edges running in close proximity to the peripheral walls of the conduit 12. A slot 14 in the bottom of the conduit and extending lengthwise therein, serves as a discharge orifice. As will be observed from Fig. 7, four vanes are illustrated, arranged angularly about the shaft. These vanes are spaced equally about the shaft, and as the shaft 11 rotates, the meal or particles settling from the passage into the space between any two adjacent vanes will be carried downwardly by the rotation of the vanes with the shaft and discharged through the slot 14. The width of the arcuate wall of conduit 12 along which the outer ends of the vanes operate, from the lower end of the passage 7 or 8 to the slot 14, is greater than the corresponding length of the arc of the quadrant between two vanes, so that the particles or meal in the passage between the louvered walls can only pass downwardly through the conduit to the extent permitted by the rotation of the vanes. There will always be a layer of meal or particles in the upper part of the conduit which acts as a seal to prevent much air from moving up into the passage from the bottom of the conduit and the slot 14.

A conduit 15 is attached to one or both ends of housing 9, and communicates with the space or chamber between the inner walls of the passages 7 and 8, which would be the chamber or space between the inside louver walls. The conduit 15 is connected to a source of suction, as will be explained later herein, and this suction is communicated to the middle chamber or space of the housing between the two passages 7 and 8. The suction in this middle chamber of the housing 9 tends to draw air from outside the housing through the louvers defining the passages 7 and 8 and then crosswise through the walls of loose particles which are descending in those passages. This air moving crosswise through the walls of loose particles or meal in the passages tends to cool it rapidly, and the moving wall formed of meal or particles in each passage serves as a filter that removes most of the very fine suspended particles from the current of air. The mass of the material in the hopper 2 and conduit 12 at all times prevents air from entering, to any objectionable extent, into the passages 7 and 8 to the ends thereof. Thus, most of the air will be drawn through the material in each passage in a direction crosswise of the passage.

The chamber or space in the housing 9 between the two passages 7 and 8 is considerably larger in cross sectional space than the outlet therefrom to the conduit 15 and, therefore, it acts as a plenum chamber in which any fines or small particles of the meal or solids that may be drawn entirely from the material in the passages 7 and 8 may settle out to the bottom. The bottom of this plenum chamber has a downwardly converging, trough-like wall 17a, Fig. 7, and a collecting screw 17 extends along this trough-like wall for collecting any of the fines or particles that settle out from the air current in this plenum chamber, and carrying them to a position outside of the plenum chamber where they are discharged through a suitable air lock.

Figure 6:
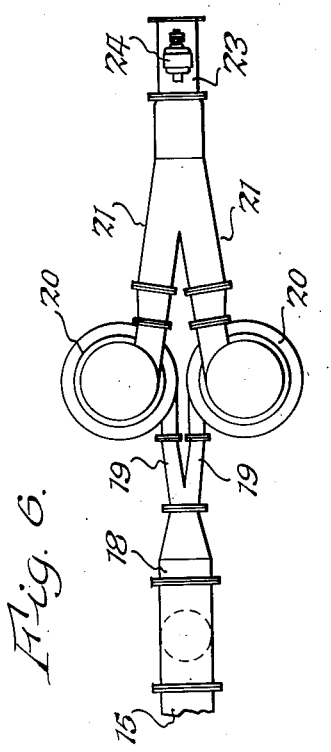
Fig. 6 is a plan of the same.

While only one conduit 15 is necessary, it is advisable at times to provide two such conduits, one leaving and opening into each end of the plenum chamber in the housing 8, and these are connected to a common conduit 18, see Fig. 5, which divides into two branches 19, see Fig. 6. Each branch 19 is connected to the intake side of a suitable related separator 20, preferably of the cyclone type, and the discharge from these separators 20 is conducted through pipes 21 to the intake side of a blower 23 which is driven by a motor 24. It will be noted that the air and any particles carried thereby, which are removed from the plenum chamber in the cooler, pass through the cyclone separators before they pass through the blower. This is advantageous, in that the solid particles or fines so removed cannot cause undue wear in the blower. The bottom of each separator is provided with a discharge valve 25 by which the solids which are separated from the air current may be removed from time to time.

Referring now to Figs. 3 and 4, the vanes 13 on each shaft 11, instead of being continuous from end to end, are divided lengthwise into sections, and the sections are separated by imperforate discs on and normal to the shaft. The vanes in each section are staggered angularly about the shaft with respect to those in the next adjacent but successive section along the shaft. To explain it in another way, the vanes in different successive sections of the conduit are offset angularly about the shaft with respect to those of the next adjacent section. The purpose of angularly offsetting these vanes in successive sections is to obtain a more uniform flow of material down the passage between the spaced louvers from side to side of each passage. There are preferably at least four vanes on the shaft in each of these successive sections, but may be more, and this provides a rotary air lock discharge at the bottom of each passage.

The shaft 11 in each conduit 12 extends outwardly at one end of the housing, and these shafts 11 are drivingly connected together by an operating belt or chain 26, which also extends over and drives a sprocket or pulley 27 on the outer end of the shaft of the screw conveyor 17. Any desired driving connection between the shafts 11 and the shaft of the screw conveyor 17 may be employed. On one of the shafts 11 is a pulley or sprocket wheel 28 which is driven from a speed reduction device 29 of any suitable construction which, in turn, is driven by a belt 30 from a motor 31. The speed reduction in the unit 29 may be at a ratio of 450 to 1, or whatever other ratio is desired.

The slot 14 at the bottom of each conduit 12 opens into a duct 32, see Fig. 4, which preferably increases in diameter as it progresses away from the slot 14, and these ducts 32 merge into a common discharge duct 33. The screw conveyor 17 also discharges through an air lock into duct 33, so that the solids settling out of the air in the plenum chamber will be returned progressively to the streams of meal or particles which are being passed through the passages 7 and 8. Most of the fines which are drawn off with the air will settle out in the plenum chamber, and only a very minor amount will be carried over to be separated in the cyclone separators. Therefore, it will be observed that the fines will be largely returned to the stream of meal or particles in the same proportion as in the meal approaching the cooler, and this avoids bunching of the fines in a part only of the mass.

Figure 8:
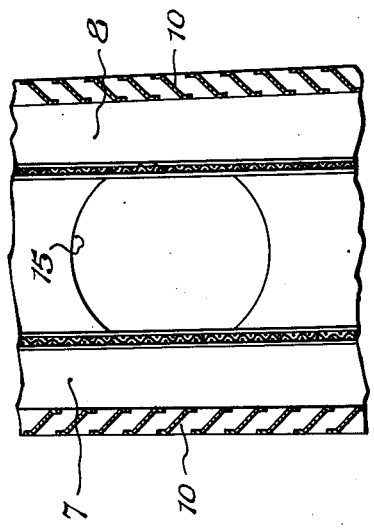
Fig. 8 is a diagram similar to Fig. 7, but with the louvers along the inside wall of each passage replaced by a wire screen, to illustrate a modification of the apparatus.

In the embodiment of the invention illustrated in Fig. 8, the inside wall of each passage 7 and 8 is of a stainless steel wire screen which serves the same purpose as the louvered wall and it may be employed if desired, on either or both face walls of passages 7 and 8.

In operation of the unit, the meal enters the hopper 2 in a continuous and uniform stream through a conveyor 1 from some external source. An electric circuit control, including the pressure operated switch 6 on the hopper, is arranged to shut off the operating parts if the level of meal in the hopper 2 falls below the minimum point which will insure a continuous wall of meal throughout the length and breadth of the hopper. The meal from the hopper 2 passes downwardly into and through the two passages 7 and 8 in the housing, where cooling air is drawn crosswise through the moving walls or columns of meal, which cools the meal. Any of the fine meal or particles which is pulled from the moving columns or streams of meal or particles through the louvers or reticulated walls of either passage will be largely collected in the plenum chamber, which is in the housing between the two passages, and promptly returned to the discharge stream of meal passing along the discharge duct 33.

An important advantage of this cooler is that one can pull a sufficient quantity of air through a wall of comparatively fine solids or mixture of particles, such as soya bean meal to cool it rapidly, and to have such a wall of meal permit the passage of sufficient air crosswise through it to cool it without pulling a substantial amount of fine meal through the openings in the side walls of the passage. The increase in cross sectional dimensions of the passages 7 and 8, progressively downwardly, prevents choking or blocking of the passages by packing of the meal against the walls of the conduit. It has been found that such a column of solid particles or meal not only allows sufficient air to pass through it to effectively cool it, but the particles themselves act as a filter and prevent pulling of most of the dust particles from such column of meal by the air current. The subsequent separation of dust from the stream of air, such as by the cyclone separators, which is a necessary part of any cooling system, is a very simple and insignificant operation compared to what is normally required for such equipment.

It is important that the meal or particles in hopper 2 completely seal the top openings into the passages 7 and 8 and ensure that no air be drawn downwardly through the feed hopper into passages 7 and 8 to any substantial extent. It is also important that a continuous mass of particles be maintained at the bottom of each of the passages 7 and 8 so that no substantial amount of air will be drawn up through the discharge hopper into the cooling passages 7 and 8. The outer reticulated or louvered walls of the housing defining parts of the passages 7 and 8 are preferably movably fastened to the housing, as by hinges, to enable access to be had to the interiors of the passages when desired.

It will be understood that various changes in the details and arrangements of parts which have been herein described and illustrated in order to explain the nature of the invention may be made by those skilled in the art within the principle and scope of the invention as expressed in the appended claims.

We claim:

1. A continuous cooler for masses of loose, hot, solid, sticky particles containing some fines, which comprises a closed, vertically elongated housing having apertured side walls and providing therein a plenum chamber, means forming on the exterior of each of said side walls an upright, unobstructed, relatively straight passage defined on one side by that apertured side wall, which passage increases slowly in cross sectional dimensions, progressively in a downward direction, the part of said means which defines the opposite face of each passage also being apertured to permit entrance of air to said passage, a hopper at the top of each passage to feed said particles to that passage, means at the bottom of each passage for progressively withdrawing particles from the bottom of that passage but preventing upward flow of air into the lower end of that passage, a source of suction having a connection to the plenum chamber of said housing, said connection being disposed well above the bottom of the chamber and of considerably smaller cross sectional area than said chamber, whereby cooling air drawn horizontally through a continuous mass of said particles in each passage into said plenum chamber will lose, in said chamber, much of the fines from said mass that may be withdrawn from said mass by the cooling air.

2. The cooler as set forth in claim 1, and an air lock conveyor at the bottom of said plenum chamber for progressively removing fines from said chamber and connected at its discharge side to deliver the fines back to the cooled mass.

3. A continuous cooler for masses of loose, hot, solid sticky particles having a substantial quantity of fines mechanically entrained therein, which comprises a housing having a descending, broad, relatively thin unobstructed conduit which increases progressively in width and thickness in a downward direction, the face walls of said conduit being apertured to pass air therethrough in a direction horizontally from face to face, a feed chamber for said loose particles opening into the upper end of said conduit, said housing having a closed plenum chamber along one side of said conduit with the apertured wall of the conduit at said one side forming one wall of said chamber, a closure for the lower end of said conduit for continuously passing said loose particles from the lower end of said conduit while preventing entrance of air therethrough into the lower end of said conduit, a suction connection to said closed chamber well above the bottom thereof for drawing cooling air crosswise through said conduit from face to face of a wall of loose, hot particles filling said conduit at any time, and an air lock conveyor at the bottom of said plenum chamber for progressively withdrawing from said chamber any fines that were withdrawn by said air from the mass in said conduit and which settled out from that air in said plenum chamber, and progressively returning such fines to the mass of particles withdrawn through said closure.

4. The cooler as set forth in claim 3, and the entrance opening into said conduit from said feed chamber, and the opening from the lower end of said conduit into said closure being large enough to prevent blocking of said conduit by packing the particles as a bridge across either of these openings.

5. The cooler as set forth in claim 3, and means responsive to the level of solids in said feed chamber for signalling when the level of particles in said feed chamber falls enough to permit movement of an undesired amount of air from the feed chamber into the upper end of said conduit.

6. The cooler as set forth in claim 3, the entrance opening into said conduit from said feed chamber and the opening from the lower end of said conduit into said closure being large enough to prevent blocking of said conduit by packing of particles as a bridge across either of those openings, and means responsive to the level of solids in said feed chamber for signalling when the level of particles in said feed chamber falls enough to permit movement of an undesired amount of air from the feed chamber into the upper end of said conduit.

7. The cooler as set forth in claim 3, and at least one face wall of said conduit being louvered to provide the apertures, the louvers inclining inwardly and downwardly into the passage of the conduit.

8. A continuous cooler for masses of loose, hot, sticky solid particles, which comprises a housing having a feeder hopper at the top opening at a divided bottom into the upper ends of two parallel, descending passages, spaced apart in face to face relation, each passage having apertured face walls and its other lateral walls imperforate, said housing enclosing the space between said passages, with the walls of the passages forming walls of said space to form a plenum chamber, a suction connection to a lateral, upright wall of that part of said housing which encloses said space, well above the bottom of that space, for drawing air into said space from across said passages, and discharging it, said housing also having a common discharge duct into which the lower ends of said passages discharge, air sealing discharge means in the lower ends of said passages for releasing loose particles progressively into said duct while substantially preventing free entrance of air into the lower ends of said passages, and an air lock conveyor at the bottom of said plenum chamber for progressively removing fines collecting in the bottom of said plenum chamber and delivering them into said common discharge duct.

9. The cooler as set forth in claim 8, and a dust separator in said suction connection, and a suction creating device in said suction connection at the delivery side of said separator whereby any fines still suspended in the air as the air leaves said plenum chamber will be removed from the air before passing through the suction creating device.

References Cited in the file of this patent

UNITED STATES PATENTS

| | | |
|---|---|---|
| 645,366 | Mallinson | Mar. 13, 1900 |
| 742,723 | Newhall | Oct. 27, 1903 |
| 789,807 | Holl | May 16, 1905 |
| 1,219,816 | French | Mar. 20, 1917 |
| 1,276,044 | Ellis | Aug. 20, 1918 |
| 1,482,812 | Roberts | Feb. 5, 1924 |
| 1,706,708 | Robb | Mar. 26, 1929 |
| 1,787,878 | Warden-Stevens | Jan. 6, 1931 |
| 1,854,429 | Steely et al. | Apr. 19, 1932 |
| 2,060,581 | Laessig | Nov. 10, 1936 |
| 2,361,151 | Reed | Oct. 24, 1944 |
| 2,371,095 | Woodward | Mar. 6, 1945 |
| 2,552,093 | Gollbach et al. | May 8, 1951 |